A. M. JOHNSON.
HOG CATCHER AND HOLDER.
APPLICATION FILED MAR. 28, 1917.
1,227,794.
Patented May 29, 1917.
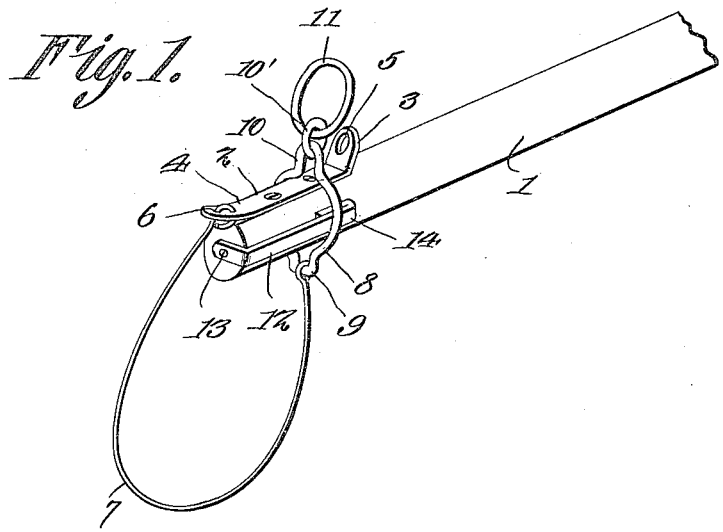
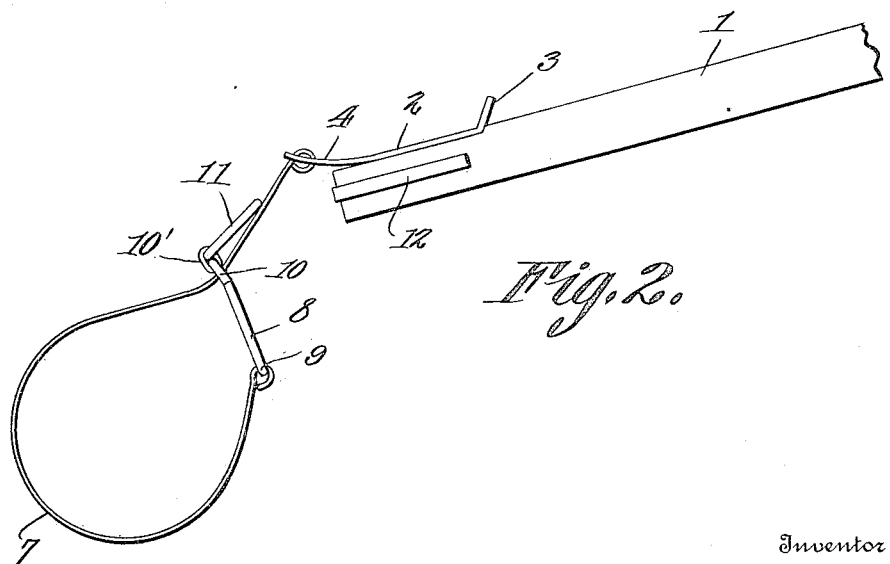
Witnesses
Inventor
A. M. Johnson
By C. A. Snow & Co.
Attorneys

UNITED STATES PATENT OFFICE.

ARLEY M. JOHNSON, OF BELLE CENTER, OHIO.

HOG CATCHER AND HOLDER.

1,227,794.  Specification of Letters Patent.  Patented May 29, 1917.

Application filed March 28, 1917. Serial No. 157,989.

*To all whom it may concern:*

Be it known that I, ARLEY M. JOHNSON, a citizen of the United States, residing at Belle Center, in the county of Logan and State of Ohio, have invented a new and useful Hog Catcher and Holder, of which the following is a specification.

My invention relates to catching and holding devices for animals.

The primary object of my invention is to provide a catching and holding device having an animal engaging member adapted to be gradually tightened in the event of prolonged struggle of the animal to be held.

Another object of my invention is to provide an improved animal catching and holding device of great simplicity and durability, and one which may be readily constructed at exceedingly small cost, and with the expenditure of very little labor.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings:

Figure 1 is a perspective view of my invention, showing the same before having been placed in engagement with an animal;

Fig. 2 is a side elevation of my invention showing the same in operative position with reference to an animal (not shown).

Referring to the drawing, 1 designates a handle provided with a terminal depression within which is mounted an elongated plate 2 having an outstanding end 3 and a slightly curved end 4. The end 3 is provided with an opening 5 for the reception of a line (not shown) should it be desired to lead an animal. The end 4 has openings 6 through which is trained and suitably fastened the end of a wire loop 7.

A ring 8 having U-shaped opposed offset seats 9 and 10 is mounted to slide upon the end of the handle 1. Within the seat 9 is fastened the other end of the loop 7. A finger ring 11 is connected to the seat 10 by a link 10'. In order to hold the ring 8 normally at rest upon the end of the handle 1, a strap 12 of resilient material such as rubber or leather is carried adjacent the plate 2, and has one extremity secured as at 13 to the end of the handle 1 and the other turned under and fastened as at 14.

When it is desired to catch an animal, the ring 8 is drawn by means of the ring 11 to position about the terminal of the handle. The loop 7 is then placed about the nose or neck of the animal, and a slight jerk given to the handle will be sufficient to cause the ring 11 to slide from the plate 2 to the wire 7, and allow the loop to become constricted about the engaged portion of the animal. Prolonged rebellion of the animal causes further constriction of the loop, and sufficient consequent pain to terminate its struggles.

Having thus described the invention, what is claimed as new is:

1. In a hog holder, the combination with a handle, of an animal engaging member connected therewith, means normally embracing said handle for securing said animal engaging member upon an animal, and means for normally holding said member upon said handle.

2. In a hog holder, the combination with a handle, of an animal engaging loop, means secured to the loop for normally embracing said handle, and a member on said handle for holding said means normally at rest upon said handle.

3. In a hog holder, the combination with a handle, of an animal engaging loop, one end thereof being connected with said handle, means normally embracing and slidable on said handle for securing the other end of said loop, and a resilient member for holding said means normally at rest upon said handle.

4. In a hog holder, the combination with a handle, of an animal engaging loop, one end thereof being connected with said handle, a member slidably embracing said handle for securing the other end of said loop, resilient means for holding said member normally at rest upon said handle, and a hand engaging element carried by said member.

5. In a device of the class described, a handle, an attaching plate secured thereto and having a yielding terminal, a member slidably mounted on the handle and plate, a hand engaging portion attached to said member, and a loop secured at its ends to said member and the yielding terminal of the plate, respectively.

In testimony that I claim the foregoing as my own, I have hereto affixed my signature in the presence of two witnesses.

ARLEY M. JOHNSON.

Witnesses:
W. B. RAMSEY,
F. E. STEPHENSON.

Copies of this patent may be obtained for five cents each, by addressing the "Commissioner of Patents, Washington, D. C."